1,703,696

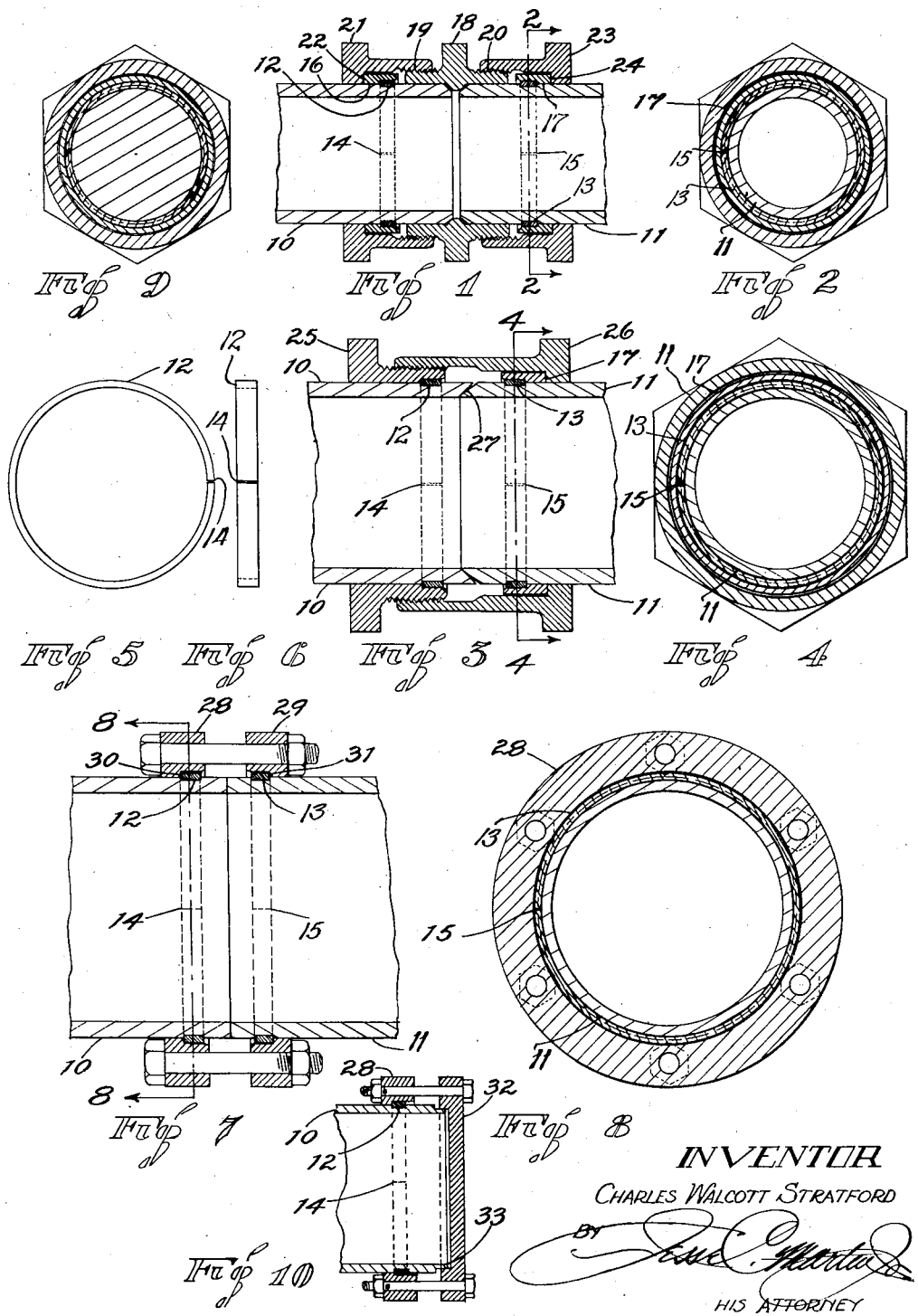
Feb. 26, 1929.
C. W. STRATFORD
1,703,696
METHOD OF AND COUPLING FOR JOINING PIPES OR THE LIKE
Filed April 7, 1925
INVENTOR
CHARLES WALCOTT STRATFORD
HIS ATTORNEY Patented Feb. 26, 1929.

UNITED STATES PATENT OFFICE.

CHARLES WALCOTT STRATFORD, OF SAN FRANCISCO, CALIFORNIA.

METHOD OF AND COUPLING FOR JOINING PIPES OR THE LIKE.

Application filed April 7, 1925. Serial No. 21,282.

My invention relates in general to making fluid tight connection between pipes, tubes or parts used in joint formation therewith being characterized by the absence of threads commonly cut on such pipes or tubes to make them up in fluid joint contact.

It is in departing from the well known and present day practice of threading pipes with so-called standard threads in pipe machines, or with dies used for the purpose, and screwing couplings or flanges on such threads to draw the pipes up in fluid tight engagement that my invention stands out.

My purpose is to provide a simple, reliable and efficient system of juncture in tube joint formation which will permit of ready coupling and disconnection through the provision of a removable shoulder on the tube not an integral part thereof, but, nevertheless, housed against movement so that to all intents and purposes it is equal in substantiality to a shoulder of like dimension which is an integral part of the tube, permitting coupling members to be drawn thereagainst in forcing the ends of the tube or tubes into joint contact.

In the adaptation of my system to the higher pressure and higher temperature services now obtaining in modern steam power plants and oil refineries, which joints are extremely hard to maintain, I advocate abutting the finished ends of the tubes against each other into joint contact, drawing the same together by means of coupling members against the removable shoulder rings as set and held below the exterior periphery of the tube in accordance with my invention. In this manner I do away with all threads cut directly on the tubes On the larger sizes of pipes or tubes, the cutting of threads not only consumes a considerable amount of time, but is an expensive operation and very frequently in cutting such threads on the pipe or tubing, the threads tear and a part of their joint forming value is sacrificed. It is in eliminating the necessity of screwing together large and cumbersome pipes or flanges onto same to be made up in joint contact that the practicability of my invention stands out, for in making up such threaded connections, unwieldly pipe wrenches or tongs are required with pipe compound inserted between the threads to insure fluid tightness, the operation being accomplished only at the extreme effort of man and helper.

In carrying out my invention I propose to utilize the present existing pipe threading machines by adapting tools therein which will cut a groove in the pipe or tube to receive a circular key or snap ring, as well as face the end thereof for a joint, the complete arrangement and purposes of which will be fully described below, so that such pipe threading machines can be put to practical use in employing my novel construction and system.

Noteworthy among the advantages of my invention over present existing constructions and methods is the relatively short time and small expense required in assembling and disassembling the same, as compared with threading pipes or tubes and screwing couplings or flanges on to bring them into joint contact. By employing what I choose to term a circular key around the outer periphery of the tube as the barrier against which the ends of the pipes are drawn into engagement, it is possible for a pipe fitter or mechanic to make up fluid tight joints on large sized pipes, tubes, headers, or the like, with the same ease as on small size pipes.

Referring to the accompanying drawing, which is generally illustrative of the principles of my invention, Fig. 1 is a longitudinal section showing the juncture of two pipes, this construction being applicable to the smaller sizes of pipes or tubing; Fig. 2 is a section taken on line 2—2, Fig. 1 through the circular key; Fig. 3 is another embodiment applicable to medium sized pipes, being a sectional elevation and showing the fluid tight joint as made directly against the ends of the abutting tubes which have been beveled and cupped out by suitable tools in a regular pipe threading machine at the time of making the grooves in the periphery of the tubes for holding the circular key; Fig. 4 is a section taken on line 4—4, Fig. 3; Figs. 5 and 6 are an end and side elevation, respectively, of the circular key shown in full with the ends of the key slightly open; Fig. 7 illustrates in sectional elevation the form of my invention applicable to the larger sizes of pipes and tubes, the tight joint being made against the faced off ends of the tubes by drawing up bolted flanges against the circular keys of the respective tubes. It will be noted that this construction serves as a flange joint union, a turning or swiveling movement of the flanges or the tubes relative to each other being allowable; Fig. 8 is a section taken on line 8—8, Fig. 7 through the circular key;

Fig. 9 is a sectional end view of a modification of Fig. 1 being taken on line 9—9, Fig. 1, and showing the circular key engaging the groove of a solid end as the terminal of a pipe line, for example; Fig. 10 is a sectional elevation showing the application of my invention in drawing up the end of a tube or cylinder into joint engagement with the surface of a head to form a fluid tight receptacle. In the several different views like numbers indicate like parts throughout, numerals 10 and 11 denoting pipe or tube ends and 12 and 13, ring keys let into grooves at the ends of the tubes, 10 and 11, respectively. Beveled joint faces are made on the ends of the tubes, 10 and 11, respectively, the grooves for the ring keys and the bevel faces being made in the same setting of machine. Ring keys, 12 and 13, are preferably made of metal with spring and of inside diameter substantially the same as the diameter at the bottom of the grooves prepared to receive them, so that after they are split at 14 and 15, respectively, they can be snapped over the ends of the tubes and into the grooves. The ends of ring keys may abut or be slightly open as desired. Fitting over ring keys, 12 and 13, are collar rings, 16 and 17, respectively, made with inside diameters substantially the same as the outside diameters thereof and serving as a housing to maintain key rings, 12 and 13, in their respective grooves; the relation of the ring keys, 12 and 13, their grooves and the collar rings, 16 and 17, being what may be termed a working fit. Over the ends of the tubes, 10 and 11, is slipped the joint ring, 18, in which bevel or chamfer faces have been made to bear in fluid tight engagement with the beveled end faces of the tubes, 10 and 11, respectively. The joint ring, 18, is threaded on its opposite ends at 19 and 20. Slipped over the end of tube, 10, prior to inserting ring key, 12, in its groove together with its collar ring, 16, is coupling ring, 21, provided with shoulder to bear against the end of collar ring, 16, at 22, being threaded at its opposite end to engage the threaded end, 19, of the joint ring, 18. Slipped over the end of tube, 11, prior to inserting ring key, 13, in its groove together with its collar ring, 17, is coupling ring, 23, provided with shoulder to bear against the end of collar ring, 17, at 24, being threaded at its opposite end to engage the threaded end, 20, of the joint ring 18. Now, by screwing up the coupling ring, 21, in its threaded engagement with joint ring, 18, the shoulder, 22, of the collar ring, 16, is brought against the end of the ring key, 12, forcing the beveled end face of the tube, 10, into fluid tight contact with the joint ring, 18, and likewise, by screwing up the coupling ring, 23, in its threaded engagement with the joint ring, 18, the shoulder, 24, of the collar ring, 17, is brought against the end of the ring key, 13, forcing the beveled joint face of the tube, 11, into fluid tight contact with the joint ring, 18.

In the construction shown in Fig. 3 a threaded collar ring, 25, is first slipped over the tube, 10, to provide a housing for the ring key, 12, thereon, whereas a coupling ring, 26, similar to the coupling ring, 23, of Fig. 1 is slipped over the end of tube, 11, prior to inserting ring key, 13, in its groove together with its collar ring, 17. The ends of the tubes, 10 and 11, are brought directly together in bevel joint contact at 27 in this adaptation of my invention, the joint being drawn together by screwing up the coupling ring, 26, in its threaded engagement with the collar ring, 25.

In the construction shown in Fig. 7 the ring keys, 12 and 13, are housed in their grooves on the tubes, 10 and 11, respectively, by the bolted flanges, 28 and 29, respectively. At the time of forming the grooves the ends of the tubes have been faced for a fluid tight joint; a much simpler and less expensive operation than if these tubes were threaded and flanges threaded to engage them. Many kinds of abutting joint faces may be employed to suit pressures and service conditions obtaining in the fluid handled. In assembling this form of my invention, which is particularly applicable to the larger sizes of pipes, tubes or headers, it is desired to note that the flanges, 28 and 29, can swivel or turn about their axes against the end shoulders, 30 and 31, of the ring keys, 12 and 13, respectively, permitting the coupling to serve as a flange union in its assembly with compensation for variation or disalignment in the line of pipe or tubing to which it is made up. Should it be desired at any time to remove the collar rings, 16 and 17, or the flanges, 28 and 29, from the tubes, 10 and 11, respectively, it is only necessary to slip same back on the tubes so as to uncover the ring keys, 12 and 13, then by spreading the splits, 14 and 15, respectively, both ring keys can be readily removed from the ends of the tubes, and the collar rings, 16 and 17, or the flanges, 28 and 29, quickly slipped therefrom.

In the construction shown in Fig. 10, the finished end surface of the tube, 10, is brought into fluid tight contact against the flange cover, 32, at 33; this application being used in forming tight joint heads of receptacles and retorts, or at the end of pipe lines.

In the use of my improved method, I am able to effect a material saving of metal in forming the coupling over that now used where screwed or welded flanges are employed. This is brought about through my ability to reduce the outside diameter of the flanges. By eliminating all joint surface on the flat faces of the flanges and drawing the ends of the pipes or tubes into direct joint contact, I am enabled to reduce the diameter of the flange bolt circle and consequently the diameter of the flanges, it only being necessary to provide reasonable clearance between the heads of the bolts and nuts and the tube ends, as illustrated in Fig. 7. Furthermore, I eliminate the extended hubs on the flanges as now used for threading.

In the adaptation of my invention to coupling the softer metal tubes, I contemplate cutting the groove for retaining the removable shoulder ring by means of the ring itself, which being made of a harder metal than the tube, preferably steel, and provided with a cutting edge, forms the groove when the housing maintaining it in contact with the exterior periphery of the tube is drawn against the ring to force the finished joint end of the tube into fluid tight engagement.

Various modifications of my invention as herein set out may be made by those skilled in the art without departing from its principles which cover broadly in scope a system of connecting pipes, tubes, or the like, in fluid tight engagement, without employing screw threads cut thereon, by the provision of a ring in removable engagement with the pipe or tube below its exterior periphery, or in which a removable ring or circumferential key of lesser inside diameter than the outside diameter of the tube is used to shoulder a coupling member thereon, whereby to permit the end or ends of such pipes or tubes to be drawn together in fluid tight contact.

What I claim is:

A coupling for pipes, comprising in combination, opposing pipe ends, grooves adjacent the end of each of said pipes, split rings in each of said grooves, and flanges enclosing the rings in said grooves and engaging the shoulders of the rings furthest away from the pipe ends, said flanges internally threaded and means externally threaded engaging the internal threads of the flanges for drawing the pipes into fluid-tight engagement.

CHARLES WALCOTT STRATFORD.